United States Patent [19]
Zorowski et al.

[11] 3,711,934
[45] Jan. 23, 1973

[54] METHOD OF PREPARING METAL FOIL/GRAPHITE FIBER/EPOXY RESIN LAMINATES

[75] Inventors: Carl F. Zorowski; John D. Calfee, both of Raleigh, N.C.

[73] Assignee: Monsanto Company, St. Louis, Mo.

[22] Filed: Sept. 17, 1970

[21] Appl. No.: 72,991

[52] U.S. Cl. ............... 29/445, 29/446, 29/475, 156/163, 156/165, 156/242
[51] Int. Cl. ............................................. B23p 9/00
[58] Field of Search ............... 29/446, 460, 475, 445; 156/242, 163

[56] References Cited

UNITED STATES PATENTS

| | | | |
|---|---|---|---|
| 2,845,699 | 8/1958 | Woodard | 29/445 UX |
| 2,949,667 | 8/1960 | Cameron et al. | 29/445 X |
| 3,004,324 | 10/1961 | Macomber | 29/460 X |
| 3,052,021 | 9/1962 | Needham | 29/445 X |
| 3,200,026 | 8/1965 | Brown | 156/163 X |
| 3,480,501 | 11/1969 | Burch | 156/245 X |
| 3,655,472 | 4/1972 | Chandler | 156/163 X |

*Primary Examiner*—Charlie T. Moon
*Attorney*—Vance A. Smith, Russell E. Weinkauf, John D. Upham and Neal E. Willis

[57] ABSTRACT

Novel metallic foil/graphite fiber/epoxy laminates with compound curvature are fabricated through a unique fabrication process which includes the steps of preparing the laminate in the prepreg stage with the metallic foil layers overlapping the graphite layers, clamping the overlapped portion of the foil layers and pulling the laminate down over a mandrel of desired compound curvature, and curing the resulting curved laminate.

3 Claims, 3 Drawing Figures

PATENTED JAN 23 1973

3,711,934

INVENTORS
CARL F. ZOROWSKI
JOHN D. CALFEE

BY Vance A. Smith

ATTORNEY

METHOD OF PREPARING METAL FOIL/GRAPHITE FIBER/EPOXY RESIN LAMINATES

CROSS-REFERENCES TO RELATED INVENTIONS

This application is related to commonly assigned and copending applications Ser. No. 889,395 filed Dec. 31, 1969, now abandoned, of John D. Calfee and David A. Zaukelies; Ser. No. 17,099 filed Mar. 6, 1970, now abandoned, of David A. Zaukelies; and Ser. No. 48,961 filed June 23, 1970 of John D. Calfee.

BACKGROUND OF THE INVENTION

1. Field of the Invention

The present invention relates to a metallic foil/graphite fiber/epoxy laminate structure having compound curvature and a method of producing the same.

2. Discussion of the Prior Art

In the referenced copending applications, Ser. No. 889,395 and Ser. No. 17,099, detailed descriptions are given of metallic foil/graphite fiber/epoxy laminates which display marked increases in transverse strengths and moduli over all graphite fiber/epoxy laminates, the latter being weak in directions transverse to the fiber direction. Referenced copending application Ser. No. 48,961 describes a similar laminate with improved impact resistance due to the addition and critical positioning of layers of highly resilient fibers such as glass fibers. The laminates as described and claimed in the referenced applications are generally suitable for use in aircraft and the like where high strength/high modulus, low density materials having thicknesses between about 20 to 60 mils are needed.

The use of the laminates, however, has been limited to flat structures or structures with simple curvatures. Many portions of an aircraft, the nose section, for example, have curvatures both around and along the longitudinal dimension, such curvature is hereinafter called compound curvature. Attempts to fabricate shapes having compound curvature from laminates described in the copending applications heretofore have not met with success. The foil itself is easily bent, drawn, or stretched when constrained to conform to a shape with desired compound curvature. On the other hand, graphite fiber layers are relatively inextensible and tend to break, separate, and abraid when such constraints are imposed.

It is therefore an object of the present invention to provide for a process by which metallic foil/graphite fiber/epoxy laminates having compound curvature may be made.

It is another object of the present invention to provide for a metallic foil/graphite fiber/epoxy laminate having compound curvature.

BRIEF DESCRIPTION OF THE DRAWINGS

The novel features believed characteristic of the present invention are set forth in the appended claims. The invention with further objects and advantages thereof may be best understood by reference to the following description taken in connection with the accompanying drawings in which:

DESCRIPTION

Figure 1:
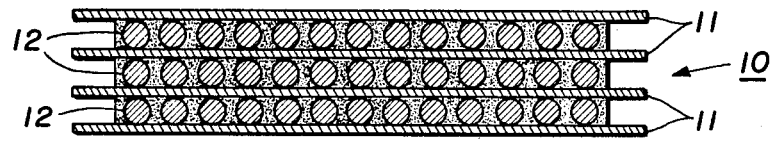
FIG. 1 is a schematic of a typical metallic foil/graphite fiber/epoxy resin prepreg which may be used in accordance with the present invention.

FIG. 1 illustrates schematically a multilayer metallic foil/graphite fiber/epoxy resin prepreg 10. As depicted, metallic foil layers 11 overlap graphite fiber/epoxy resin layers 12. Glass (or other resilient) fiber layers may be added as desired. As explained below, the overlap portions provide a means by which the foil layers may be drawn without significantly affecting the relatively non-stretchable graphite fibers. The metallic foil may be any metallic material such as, for example, aluminum, titanium, steel, or any alloy thereof.

Figure 2:
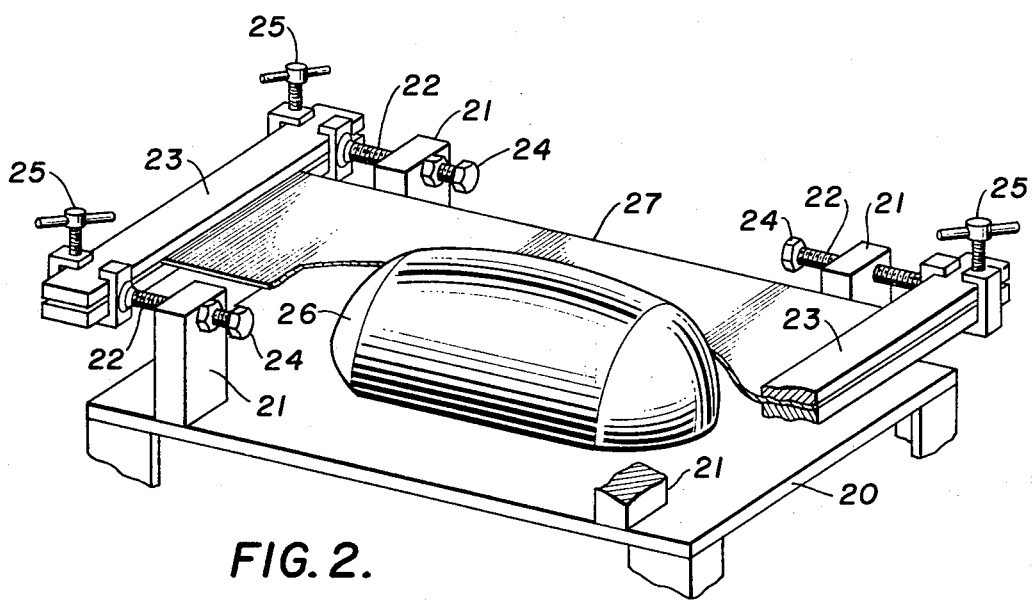
FIG. 2 is a perspective view of an apparatus which may be utilized to practice a preferred feature of the present invention.

FIG. 2 illustrates an apparatus which may be used to form a metallic foil/graphite fiber/epoxy laminate with compound curvature from a prepreg such as that depicted in FIG. 1. Base plate 20 is attached to four upright members 21, each of which fixedly support a thrust bolt 22. Each pair of thrust bolts 22 movably support a clamping rail 23. Nuts 24 positioned on thrust bolts 22 provide the movement of rails 23. Resilient means, such as C clamps 25, maintain rails 23 movably closed.

In operation, a mandrel or mold 26 having the compound curvature desired is centered on base plate 20 between upright members 21. A metallic foil/graphite fiber/epoxy resin prepreg 27 (of a structure similar to that illustrated by FIG. 1) is loosely clamped on the extended portion of metallic foil by clamping rails 23. A lubricant, such as polyethylene dispersed in a grease, is placed on mold 26 to reduce friction between the foil and mandrel thereby preventing galling, scratching or marring of the foil. Base plate 20 may be adjustable in height so as to ensure that the plane extending between clamping lines of clamping rails 23 is at the desired level above plate 20.

Figure 3:
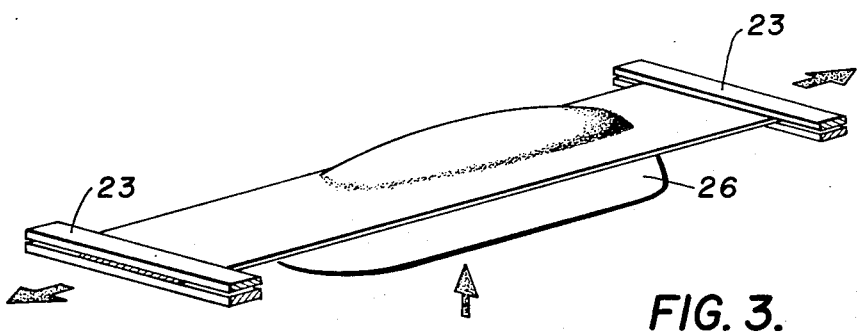
FIG. 3 is a perspective view of a prepreg similar to that illustrated in FIG. 1 being drawn over a mandrel of selected compound curvature.

As shown in the perspective schematic of FIG. 3, increasing tension is supplied to the metallic foil by moving clamping rails 23 in the direction indicated by the arrows. The increasing tension causes the metallic foil to draw out and down over mandrel 26 while concurrently causing the graphite fibers to distort in conformity with the compound curvature of mandrel 26. It is necessary that the resin be present in amount sufficient to wet the surface of the foil and fibers during the drawing process. The laminate may then be cured while maintaining the tension on the metallic foil. It is also desirable that the metallic foil be partially annealed so as to provide sufficient ductility for drawing.

Reference is now made to the following example which is illustrative of a preferred technique of preparing prepregs to be utilized in accordance with the present invention and describes in greater detail the stretching and deformation of the prepreg.

EXAMPLE

Although there are various techniques by which multi-layer metallic foil/graphite resin laminates can be made, such as, for example, laying graphite fiber prepreg tapes directly on metallic foil held under tension, the preferred process is that which is described in the referenced copending application, Ser. No. 17,099.

Briefly, a sample of commercially available graphite yarn, for example, HMG-50 obtainable from the Hitco Company, may be utilized to prepare the prepreg sheet of this example. The yarn derived from a rayon precursor, was a 1440-filament 2-ply, 4 turns per inch yarn with a modulus of about $50 \times 10^3$ lbs/sq. inch and a tensile strength of $300 \times 10^3$ lbs/sq. inch. The yarn was unreeled from a bobbin (power driven to minimize tension) and passed at about 30 feet per minute through a heating oven raised to a temperature of about 1250°–1350°C, and filled with nitrogen containing about 0.3 percent oxygen. After cooling in another chamber with nitrogen, the yarn was wrapped under about 80 grams tension onto a lathe-driven 13.5 inch diameter drum wrapped with a solvent-cleaned bail of commercially available 5 mil aluminum foil.

A resin having good adhesive characteristics, such as commercially available bisphenol, an adhesive-type of epoxy resin formulation (American Cynamide BP–907, containing a catalytic curing agent) was added continuously from a nozzle set at the point of juncture of the yarn and drum. The resin loading, after evaporation of the solvent, was about 40 percent by volume. A transverse mechanism synchronized with the lathe, slowly laid the impregnated yarn in a single spiral layer, side-by-side across the face of the drum. The layer of resin and fiber was air-dried on the drum to a solvent content of about 1 percent and then removed from the drum. To ensure proper wetting of foil and fiber surfaces during drawing of the foil, it is necessary that the resin be about 40 volume percent or greater. The overlap of the aluminum foil provided the extended portion of the foil on one side of the prepreg. The extended portion on the opposite side was provided by pulling the graphite fiber/epoxy resin layer away from the aluminum foil so as to expose the foil a distance sufficient for clamping. The pulled away portion of graphite fiber/epoxy resin layer was then cut away or otherwise removed.

Additional layers of 8 mil graphite fiber/epoxy resin prepreg were added to this structure, the resulting graphite fiber orientation being 0°, +45°, −45°, and 0°, respectively. Another 5 mil aluminum foil layer was added to the reverse side of the structure with portions extending beyond the graphite fiber/epoxy resin layers underneath.

The laminate prepreg was then placed in an apparatus similar to that illustrated by FIG. 2. A mandrel of predetermined compound curvature was placed upon the base plate beneath the laminate prepreg. The metallic foil was placed under tension sufficient to cause the metallic foil to be stretch drawn down over the mandrel while concurrently causing the graphite fibers to conform to the mandrel's compound shape. The laminate prepreg was then cured at about 350°F for approximately 1 ½ hours while being held under tension over the mandrel. The laminate was then removed from the stretching apparatus and inspected. An examination of the laminate detected no delamination. Fiber orientation was also unaffected other than to the extent that the fibers follow the compound curvature of the mandrel.

In summary, the objectives as set forth have been attained. A method of fabricating metallic foil/graphite fiber/epoxy laminates with compound curvature heretofore unattainable has been demonstrated. The novel laminates so fabricated are suitable for applications where curved structures of high strengths/moduli and low density are needed. Thus, it will be apparent to those skilled in the art in light of this disclosure that variations and changes may be made which do not depart from the full intended scope of the invention as defined by the following claims.

What is claimed is:

1. 
  a. Preparing a metal foil/graphite fiber/resin epoxy laminate with the metal foil layers extending beyond the graphite fiber/resin epoxy layers in the longitudinal direction;
  b. clamping under tension the extension of the metal foil layers;
  c. drawing the metal foil layers around a mold having a predetermined compound curvature, the resin content of the prepreg being sufficient to permit resin flow for essentially complete wetting of the graphite fibers and surfaces of the metal foil layers and for filling the interstices in the graphite fiber layers during drawing; and
  d. curing the stretched metal foil/graphite fiber/resin epoxy prepreg.

2. The process of claim 1 wherein the epoxy resin content is greater than about 40 volume percent.

3. The process of claim 2 wherein the epoxy resin content is about 60 volume percent.

* * * * *